United States Patent
Tsai et al.

(10) Patent No.: US 9,804,992 B2
(45) Date of Patent: Oct. 31, 2017

(54) COMPUTER SYSTEM AND METHOD FOR ACCESSING VIRTUAL MACHINE

(71) Applicant: ACCELSTOR, INC., New Taipei (TW)

(72) Inventors: Pan-Lung Tsai, New Taipei (TW); Hann-Huei Chiou, New Taipei (TW)

(73) Assignee: Accelstor, Inc., New Taipei (TW)

( * ) Notice: Subject to any disclaimer, the term of this patent is extended or adjusted under 35 U.S.C. 154(b) by 243 days.

(21) Appl. No.: 14/851,130

(22) Filed: Sep. 11, 2015

(65) Prior Publication Data

US 2016/0321092 A1  Nov. 3, 2016

(30) Foreign Application Priority Data

Apr. 30, 2015 (TW) .............................. 104113837 A

(51) Int. Cl.
*G06F 9/455* (2006.01)
*G06F 13/42* (2006.01)

(52) U.S. Cl.
CPC ...... *G06F 13/4282* (2013.01); *G06F 9/45558* (2013.01); *G06F 2009/45579* (2013.01)

(58) Field of Classification Search
CPC ................................................. G06F 13/4282
USPC ........................................................... 718/1
See application file for complete search history.

(56) References Cited

U.S. PATENT DOCUMENTS

| | | | | |
|---|---|---|---|---|
| 2004/0249947 | A1* | 12/2004 | Novaes | G06F 9/45537 709/226 |
| 2006/0026383 | A1* | 2/2006 | Dinechin | G06F 12/109 711/207 |
| 2013/0103380 | A1* | 4/2013 | Brandstatter | G06F 9/45558 703/26 |
| 2013/0117530 | A1* | 5/2013 | Kim | G06F 9/45558 711/206 |
| 2013/0262075 | A1* | 10/2013 | Kuwamura | G06F 9/455 703/27 |
| 2014/0282508 | A1* | 9/2014 | Plondke | G06F 9/45533 718/1 |

\* cited by examiner

*Primary Examiner* — Timothy A Mudrick
(74) *Attorney, Agent, or Firm* — Rosenberg, Klein & Lee

(57) ABSTRACT

The invention provides a computer system and a method for accessing virtual machine. The computer system comprises a host operating system installed with a host driver and a virtual machine. The virtual machine comprises a hypervisor and a guest operating system. When the host operating system is intended for accessing the virtual machine, it will issue at least one access instruction to the hypervisor of the virtual machine via the host driver. The guest operating system of the virtual machine receives the access instruction from the hypervisor via a guest driver, and accesses a guest application program, a real hardware, and/or a virtual hardware according to the indication of the access instruction so as to generate an access result. Finally, the guest operating system of the virtual machine is able to transmit the access result to the host operating system.

17 Claims, 6 Drawing Sheets

COMPUTER SYSTEM AND METHOD FOR ACCESSING VIRTUAL MACHINE

CROSS-REFERENCE TO RELATED APPLICATIONS

This non-provisional application claims priority claim under 35 U.S.C. §119(a) on Taiwan Patent Application No. 104113837 filed Apr. 30, 2015, the entire contents of which are incorporated herein by reference.

FIELD OF THE INVENTION

The present invention is related to a computer system and a method for accessing virtual machine, particularly to a computer system and a method for accessing virtual machine regarded as system device or peripheral device.

BACKGROUND

Virtual machine is a particular software capable of simulating operational functions of system device, peripheral device or application program. In the past virtual machine environment, a host operating system can access a guest data of virtual machine via a network service, for example, HTTP, FTP, NFS, or CIFS.

The Virtual machine is composed of a hypervisor and a guest operating system, and it essentially can be considered as an application program of a host. Therefore, the host is capable of performing data exchange between the Virtual machine and other application programs by the means of shared memory (SHM).

The guest operating system and the guest application program of the current virtual machine are both packaged by utilizing a technology for operating system level virtualization (OS-level Virtualization) or called container, such that the host application program must be adopted a means of an inter-process communication (IPC) to access data of container instance of the virtual machine, the means of which is different from a manner for general accessing the system device or the peripheral device.

Accordingly, the invention will be provided with a novel technology for accessing virtual machine, in which the novel technology is capable of accessing the virtual machine regarded as a system device or a peripheral hardware device, it is the object of the present invention to be achieved.

SUMMARY

The present invention proposes a computer system and a method for accessing virtual machine, in which the computer system is capable of accessing a virtual machine regarded as a system device or a peripheral device.

The present invention proposes a computer system and a method for accessing virtual machine, in which the computer system comprises a host operating system installed with a host driver and a virtual machine, the host operating system or a host application program is allowed to access the virtual machine by the use of the host driver.

The present invention proposes a computer system and a method for accessing virtual machine, when the virtual machine receives a access instruction issued from by the host operating system or the host application program, the host operating system or the host application program is allowed to access a real hardware or a virtual hardware of the virtual machine by the use of the hardware driver.

The present invention proposes a computer system and a method for accessing virtual machine, in which the host operating system is allowed to access the real hardware by the use of the virtual machine. Thus, if the real hardware occurs abnormality, only the operation of the virtual machine may be affected, without causing the host operating system to crash or collapse.

For achieving above objects, the present invention provides a computer system for accessing virtual machine, comprising: a host driver, installed in a host operating system; and a virtual machine, installed in the host operating system, wherein the host operating system or a host application program is for issuing at least one access instruction, the access instruction is then transmitted to the virtual machine via the host driver, the virtual machine comprising: a hypervisor, comprising an expansion module, wherein the expansion module receives the access instruction from the host driver, and performs a format conversion process for the access instruction so that the instruction format of the access instruction can be recognized by the virtual machine; and a guest operating system, comprising: a guest driver; a guest service program, wherein the guest driver receives the access instruction from the expansion module and transmits the access instruction to the guest service program, the guest service program will recognize that the access instruction is a read instruction, a write instruction, or a control instruction; and a guest application program, wherein the guest service program is allowed to access the guest application program according to the indication of the access instruction so as to obtain a first access result, and then transmit the first access result to the host operating system or the host application program.

In one embodiment of the present invention, the first access result obtained by the guest service program accessing the guest application program is transmitted to the host operating system or the host application program via the guest driver, the expansion module and the host driver.

In one embodiment of the present invention, the guest application program of the virtual machine is a program capable of executing in the host operating system.

In one embodiment of the present invention, the guest operating system further comprises a first hardware driver, the first hardware driver is connected to a real hardware via a hardware pass-through unit, the guest service program transmits the access instruction to the real hardware via the first hardware driver and the hardware pass-through unit so as to access the real hardware, therefore obtain a second access result, and then transmit the second access result to the host operating system or the host application program.

In one embodiment of the present invention, the second access result obtained by the guest service program accessing the real hardware is transmitted to the host operating system or the host application program via the guest driver, the expansion module and the host driver.

In one embodiment of the present invention, the hypervisor further comprises a virtual hardware, the guest operating system further comprises a second hardware driver, the guest service program transmits the access instruction to the virtual hardware via the second hardware driver so as to access the virtual hardware, therefore obtain a third access result, and then transmit the third access result to the host operating system or the host application program.

In one embodiment of the present invention, the virtual machine is simulated as a system device or a peripheral device conforming to PCI, PCI Express, SATA or USB transport protocols by the host operating system.

The present invention further provides a computer system for accessing virtual machine, comprising: a host driver, installed in a host operating system; a virtual machine, installed in the host operating system, wherein the host operating system or a host application program is for issuing at least one access instruction, the access instruction is then transmitted to the virtual machine via the host driver, the virtual machine comprising: a hypervisor, comprising an expansion module, wherein the expansion module receives the access instruction, and performs a format conversion process for the access instruction so that the instruction format of the access instruction can be recognized by the virtual machine; and a guest operating system, comprising: a guest driver; a guest service program, wherein the guest driver receives the access instruction from the expansion module and transmits the access instruction to the guest service program, the guest service program will recognize that the access instruction is a read instruction, a write instruction, or a control instruction; and a first hardware driver; and a real hardware, wherein the first, hardware driver is connected to the real hardware via a hardware pass-through unit, the guest service program transmits the access instruction to the real hardware via the first hardware driver and the hardware pass-through unit so as to access the real hardware, therefore obtain a second access result, and then transmit the second access result to the host operating system or the host application program.

The present invention further provides a method for accessing virtual machine, the method being applied to a computer system that will regard the virtual machine as a system device, a peripheral device, or an application program, the computer system comprising a host operating system installed with a host driver and a virtual machine, the virtual machine comprising a hypervisor and a guest operating system, in which the hypervisor comprises an expansion module, the guest operating system comprises a guest driver, a guest service program, and a guest application program, the method comprising the following steps of: issuing an access instruction from the host operating system or a host application program; transmitting the access instruction to the virtual machine via the host driver; receiving the access instruction via the expansion module of the hypervisor by the virtual machine and performing a format conversion process for the access instruction by the expansion module of the hypervisor so that the instruction format of the access instruction can be recognized by the virtual machine; transmitting the access instruction to the guest service program via the guest driver by the expansion module of the hypervisor; and accessing the guest application program according to the indication of the access instruction by the guest service program so as to obtain a first access result and then transmit the first access result to the host operating system or the host application program.

In one embodiment of the present invention, the guest operating system further comprises a first hardware driver, the first hardware driver is connected to a real hardware via a hardware pass-through unit, the method further comprising a step of: transmitting the access instruction to the real hardware via the first hardware driver and the hardware pass-through unit by the guest service program so as to access the real hardware, therefore obtain a second access result, and then transmit the second access result to the host operating system or the host application program.

In one embodiment of the present invention, the hypervisor further comprises a virtual hardware, the guest operating system further comprises a second hardware driver, the method further comprising a step of: transmitting the access instruction to the virtual hardware via the second hardware driver by the guest service program an as to access the virtual hardware, therefore obtain a third access result, and then transmit the third access result to the host operating system or the host application program.

In one embodiment of the present invention, the method further comprising the following step of: determining a object to be accessed marked in the access instruction being the guest application program, the real hardware, or the virtual hardware by the guest service program; and accessing the guest application program, the real hardware, or the virtual hardware according to determining the object to be accessed marked in the access instruction.

The present invention further provides a method for accessing virtual machine, the method being applied to a computer system that will regard the virtual machine as a system device, a peripheral device, or an application program, the computer system comprising a host operating system installed with a host driver and a virtual machine, the virtual machine comprising a hypervisor and a guest operating system, in which the hypervisor comprises an expansion module, the guest operating system comprises a guest driver, a guest service program, and a first hardware driver, the first hardware driver is connected to a real hardware via a hardware pass-through unit, the method comprising the steps of: issuing an access instruction from the host operating system or a host application program; transmitting the access instruction to the virtual machine via the host driver; receiving the access instruction via the expansion module of the hypervisor by the virtual machine and performing a format conversion process for the access instruction by the expansion module of the hypervisor so that the instruction format of the access instruction can be recognized by the virtual machine; transmitting the access instruction to the guest service program via the guest driver by the expansion module of the hypervisor; and transmitting the access instruction to the real hardware via the first hardware driver and the hardware pass-through unit by the guest service program so as to access the real hardware, therefore obtain a second access result, and then transmit the second access result to the host operating system or the host application program.

DETAILED DESCRIPTION OF THE PREFERRED EMBODIMENTS

Figure 1:
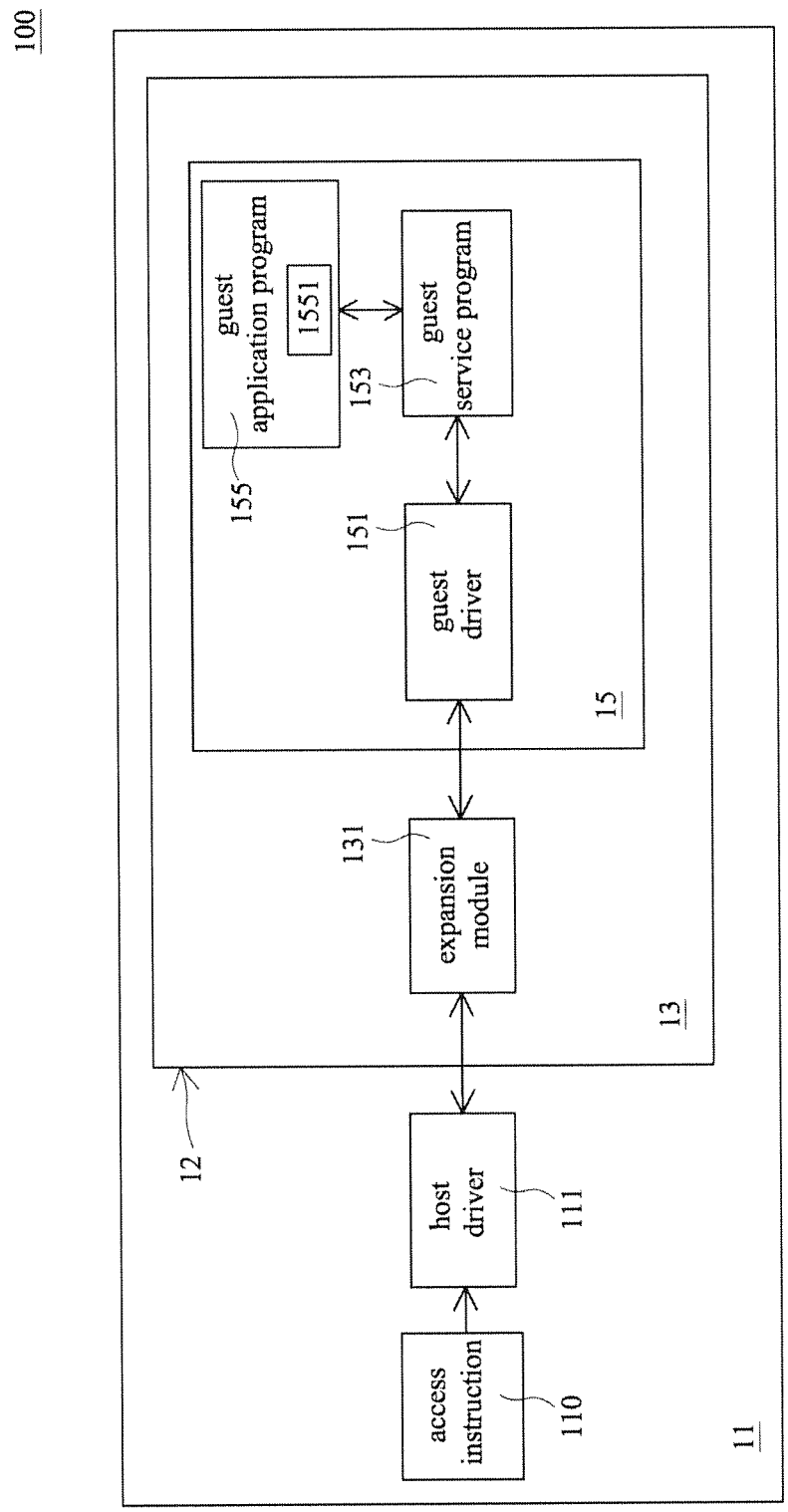
FIG. 1 is a structural diagram of a computer system for accessing virtual machine according to one embodiment of the present invention.

Referring to FIG. 1, there is shown a structural diagram of a computer system for accessing virtual machine according to one embodiment of the present invention. As illustrated in FIG. 1, the computer system 100 of the present embodiment comprises a host operating system 11. The host operating system 11 is installed with a host driver 111 and a virtual machine 12.

Wherein the virtual machine 12 comprises a hypervisor 13 and a guest operating system 15. The hypervisor 13 comprises an expansion module 131, and the guest operating system 15 comprises a guest driver 151, a guest service program 153, and a guest application program 155. In the present embodiment, the guest application program 155 is a program capable of executing in the host operating system 11.

When the host operating system 11 or a host application program is intended for executing a data access procedure for the guest application program 155 of the virtual machine 12, it will issue at least one access instruction 110 to the virtual machine 12 via the host driver 111. Moreover, the host driver 111 sends a software interrupt to the expansion module 131 so that the access instruction 110 is allowed to transmit to the expansion module 131. After the expansion module 131 receives the access instruction 110, it will be used to perform a format conversion process for the access instruction 110 so that the instruction format of the access instruction 110 can be recognized by the virtual machine 12. When the access instruction 110 has been format converted, the expansion module 131 sends a virtual hardware interrupt to the guest driver 151 so that the access instruction 110 is allowed to transmit to the guest driver 151. After the guest driver 151 receives the access instruction 110, it will send a software interrupt to the guest service program 153 so that the access instruction 110 is allowed to transmit to the guest service program 153. The guest service program 153 is capable of recognizing the access instruction 110 being a read instruction, a write instruction, or a control instruction, transmitting the access instruction 110 to the guest application program 155, and then accessing the guest application program 155 according to the indication of the access instruction 110 so as to obtain a first access result 1551. Finally, the guest service program 153 is allowed to transmit the first access result 1551 to the host operating system 11 or the host application program via the guest driver 151, the expansion module 131 and the host driver 111. Accordingly, the host operating system 11 or the host application program may be completed the data access procedure for the guest application program 155 of the virtual machine 12.

Figure 2:
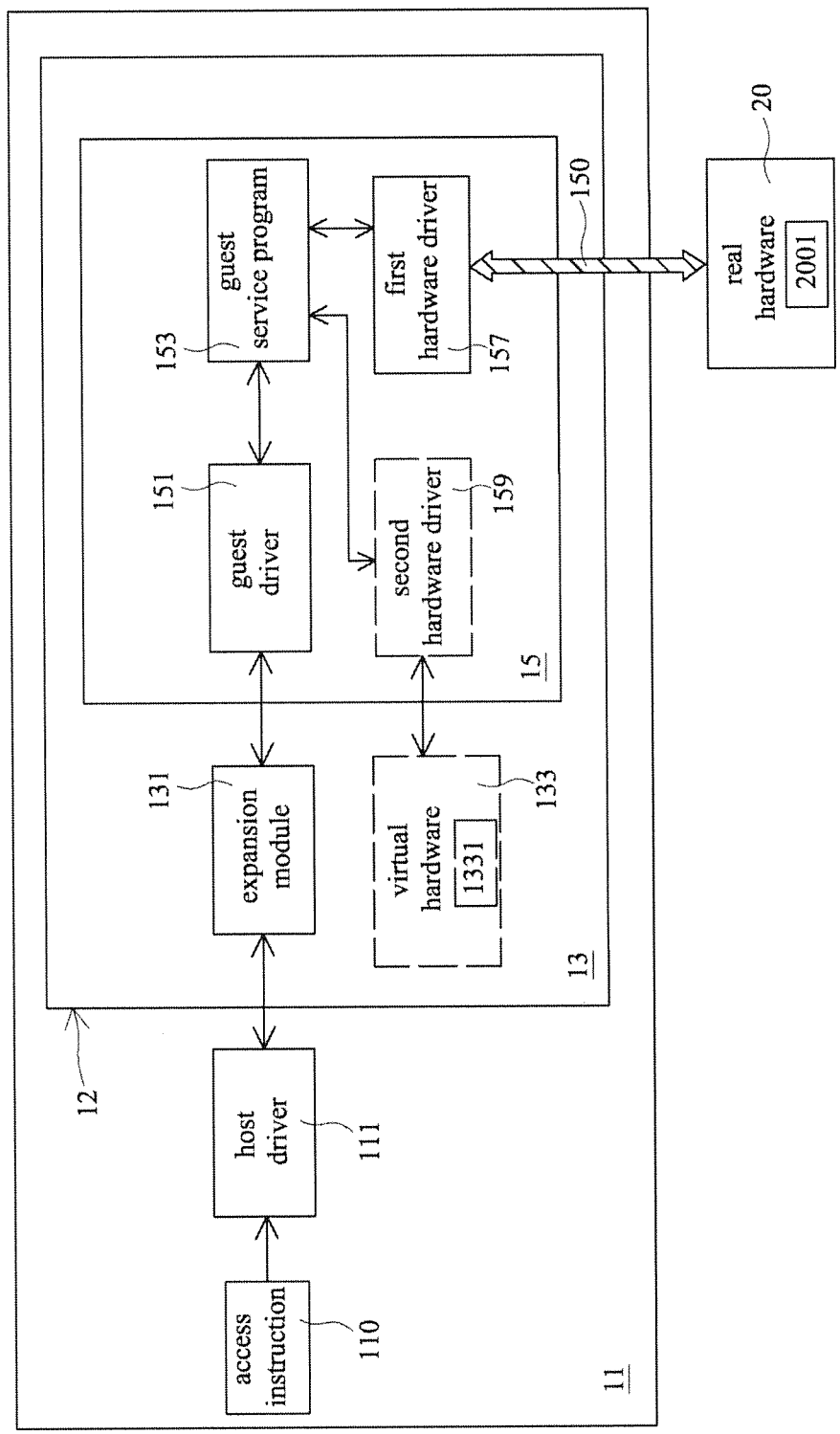
FIG. 2 is a structural diagram of a computer system for accessing virtual machine according to another embodiment of the present invention.

Referring to FIG. 2, there is shown a structural diagram of a computer system for accessing virtual machine according to another embodiment of the present invention. As illustrated in FIG. 2, the computer system 101 of the present embodiment is similar to the computer system 100 of the above mentioned embodiment, the differences between which are that the elements installed in the guest operation system 15 of the virtual machine 12.

The guest operation system 15 of the present embodiment comprises the guest driver 151, the guest service program 153 and a first hardware program 157, without comprising the guest application program 155. The first hardware driver 157 is connected to a real hardware 20 via a hardware pass-through unit 150. The hardware pass-through unit 150 is a software interface capable of building the communication connection between the virtual machine 12 and the real hardware 20.

When the host operating system 11 or the host application program is intended for executing a data access procedure for the real hardware 20 connected to the virtual machine 12, it will issue at least one access instruction 110 to the virtual machine 12 via the host driver 111. Moreover, the host driver 111 sends a software interrupt to the expansion module 131 so that the access instruction 110 is allowed to transmit to the expansion module 131. After the expansion module 131 receives the access instruction 110, it will be used to perform a format conversion process for the access instruction 110 so that the instruction format of the access instruction 110 can be recognized by the virtual machine 12. When the access instruction 110 has been format converted, the expansion module 131 sends a virtual hardware interrupt to the guest driver 151 so that the access instruction 110 is allowed to transmit to the guest driver 151. After the guest driver 151 receives the access instruction 110, it will send a software interrupt to the guest service program 153 so that the access instruction 110 is allowed to transmit to the guest service program 153. The guest service program 153 is capable of recognizing the access instruction 110 being a read instruction, a write instruction, or a control instruction, transmitting the access instruction 110 to the real hardware 20 via the first hardware driver 157 and the hardware pass-through unit 150, and then accessing the real hardware 20 according to the indication of the access instruction 110 so as to obtain a second access result 2001. Finally, the guest service program 153 is allowed to transmit the second access result 2001 to the host operating system 11 or the host application program via the guest driver 151, the expansion module 131 and the host driver 111. Accordingly, the host operating system 11 or the host application program may be completed the data access procedure for the external real hardware 20.

In another embodiment of the present invention, the guest operating system 15 further comprises a second hardware driver 159, and the hypervisor 13 further comprises a virtual machine 133.

Similarly, when the host operating system 11 or the host application program is intended for executing a data access procedure for the virtual hardware 133 of the virtual machine 12, it will issue at least one access instruction 110 to the virtual machine 12 via the host driver 111. The access instruction 110 may be transmitted to the guest service program 153 via the transduction of the host driver 111, the expansion module 131, and the guest driver 151. The guest service program 153 is capable of recognizing the access instruction 110 being a read instruction, a write instruction, or a control instruction, transmitting the access instruction 110 to the virtual machine 133 via the second hardware driver 159, and then accessing the virtual machine 133 according to the indication of the access instruction 110 so as to obtain a third access result 1331. Finally, the guest service program 153 is allowed to transmit the third access result 1331 to the host operating system 11 or the host application program via the transduction of the guest driver 151, the expansion module 131, and the host driver 111. Accordingly, the host operating system 11 or the host application program may be completed the data access procedure for the virtual hardware 133 of the virtual machine 12.

Accordingly, in the present invention, the virtual machine 12 may be simulated as a system device or a peripheral device conforming to PCI, PCI Express, SATA, USB transport protocols or other specification interface transport protocols by the host operating system 11. In other words, the virtual machine 12 of the present invention can be regarded as a real system device or a real peripheral device by the host operating system 11. Therefore, the host operating system 11 is capable of accessing the virtual machine 12, via the drivers 111, 151, 157, and/or 159, based on the means of access of the system device or the peripheral device.

Furthermore, the host operating system 11 of the present invention is allowed to access the real hardware 20 by the use of the virtual machine 12. If the real hardware 20 occurs abnormality, only the operation of the virtual machine 20 may be affected, without causing the host operating system 11 to crash or collapse. Then, safety of the host operating system 11 may be ensured during the access for the real hardware 20. Moreover, the virtual machine 12, affected by abnormality of the real hardware 20, may be restored to normal operation if only it is restarted.

Figure 3:
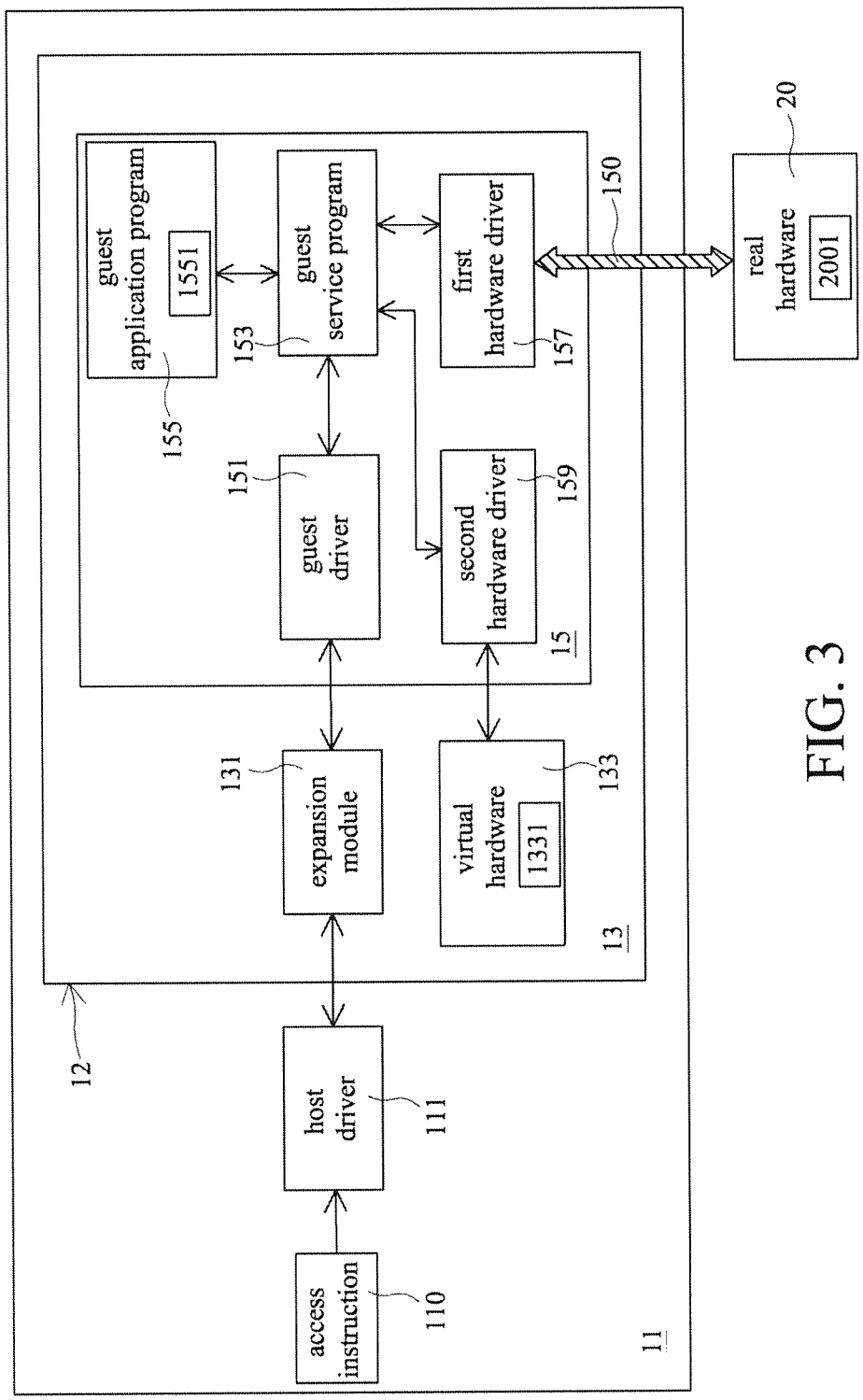
FIG. 3 is a structural diagram of a computer system for accessing virtual machine according to another embodiment of the present invention.

Referring to FIG. 3, there is shown a structural diagram of a computer system for accessing virtual machine according to another embodiment of the present invention. As illustrated in FIG. 3, the computer system 102 of the present embodiment is simultaneously installed with the guest application program 155, the virtual hardware 133, and the external real hardware 20.

When the host operating system 11 or the host application program is intended for executing a data access procedure for the guest application program 155, the real hardware 20 or the virtual hardware 133, it will issue an access instruction 110 marked with an object to be accessed. Afterward, when the guest service program 153 receives the access instruction 110, it will determine that the object to be accessed marked in the access instruction 110 is the guest application program 155, the real hardware 20, or the virtual hardware 133 so as to access one of the guest application program 155, the real hardware 20, and the virtual hardware 133 based on determining the object to be accessed marked in the access instruction 110.

Figure 4:
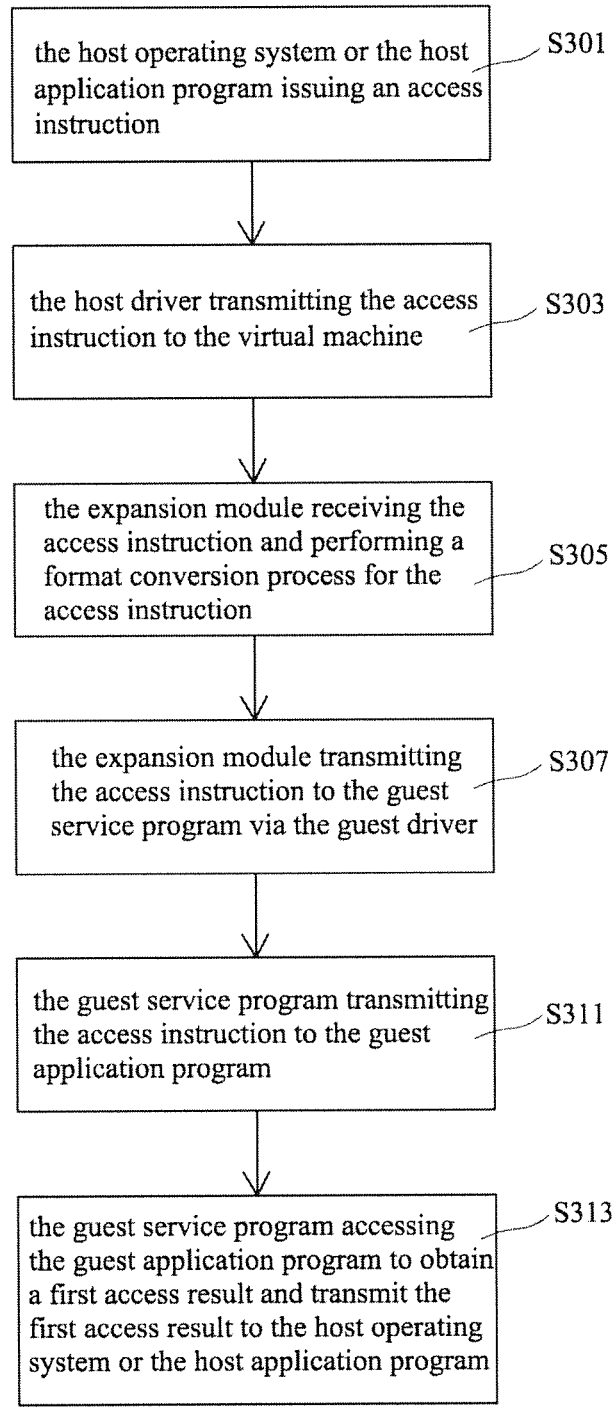
FIG. 4 is a flow chart of a method for accessing guest application program of virtual machine according to one embodiment of the present invention.

Referring to FIG. 4, cooperatively with FIG. 1, there is shown a flow chart of a method for accessing guest application program of virtual machine according to one embodiment of the present invention. When the host operating system 11 or a host application program is intended for executing the data access procedure for the guest application program 155 of the virtual machine 12, step S301 is firstly executed, such that at least one access instruction 110 is issued by the host operating system 11 or the host application program. In the step S303, the host operating system 11 or the host application program will transmit the access instruction 110 to the virtual machine 12 via the host driver 111.

In step S305, the virtual machine 12 will receive the access instruction 110 via the expansion module 131 of the hypervisor 13, and then the expansion module 131 is allowed to perform the format conversion process for the access instruction 110 so that the instruction format of the access instruction 110 can be recognized by the virtual machine 12. In step S307, the expansion module 131 transmits the access instruction 110 to the guest service program 153 via the guest driver 151.

Subsequently, in step S311, after the guest service program 153 receives the access instruction 110, it will recognize that the access instruction 110 is a read instruction, a write instruction, or a control instruction, and transmit the access instruction 110 to the guest application program 155. In step S313, the guest service program 153 is allowed to access the guest application program 155 according to the indication of the access instruction 110 so as to obtain a first access result 1551, and then transmit the first access result 1551 to the host operating system 11 or the host application program for issuing the access instruction 110. Accordingly, the host operating system 11 or the host application program may be completed the data access procedure for the guest application program 155 of the virtual machine 12.

Figure 5:
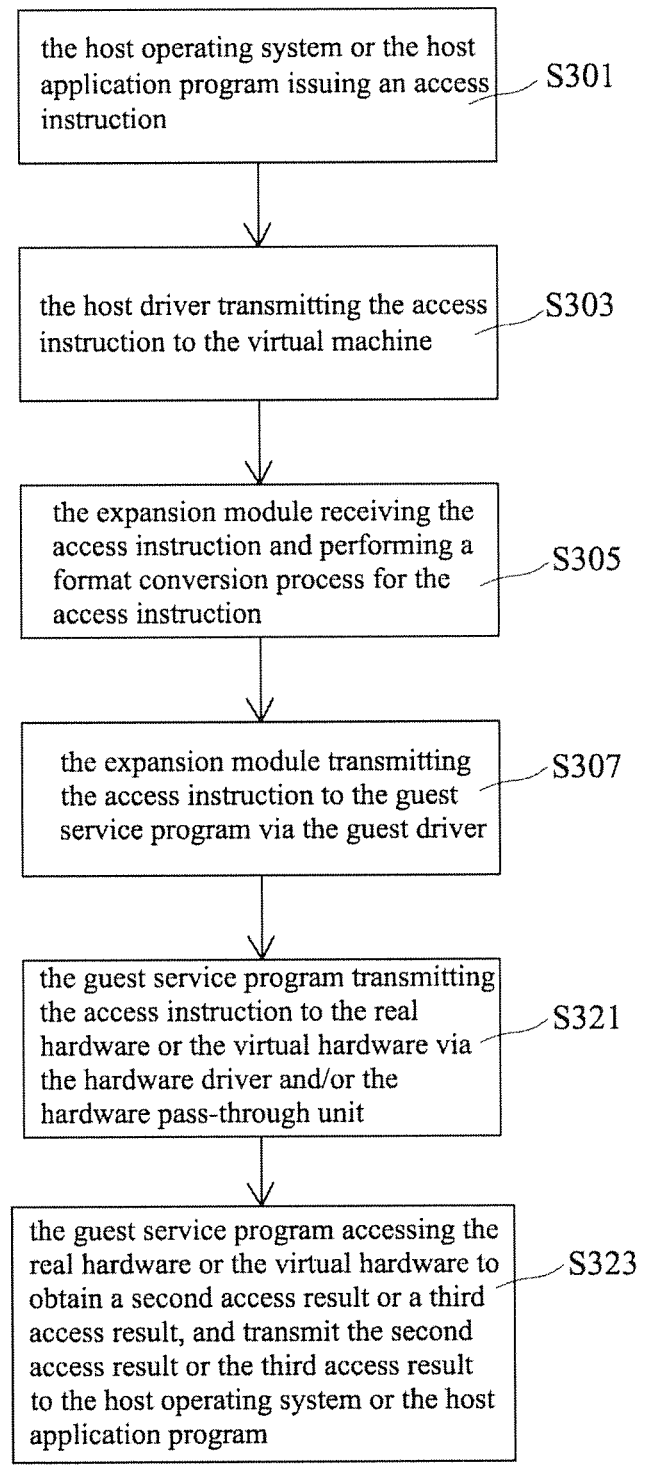
FIG. 5 is a flow chart of a method for accessing real hardware or virtual hardware of virtual machine according to one embodiment of the present invention.

Referring to FIG. 5, cooperatively with FIG. 2, there is shown a flow chart of a method for accessing real hardware or virtual hardware of virtual machine according to one embodiment of the present invention. When the host operating system 11 or a host application program is intended for executing the data access procedure for the real hardware 20 or the virtual hardware 133 of the virtual machine 12, such as the above described steps S301~S307, the host operating system 11 or the host application program is allowed to issue and transmit at least one access instruction 110 to the virtual machine 12. The expansion module 131 of the virtual machine 12 is for performing the format conversion process for the access instruction 110 after receiving the access instruction 110 so that the instruction format of the access instruction 110 can be recognized by the virtual machine 12, and then the format converted access instruction 110 is transmitted to the guest service program 153 via the guest driver 151.

Subsequently, in step S321, after the guest service program 153 receives the access instruction 110, it will recognize that the access instruction 110 is a read instruction, a write instruction, or a control instruction, and transmit the access instruction 110 to the real hardware 20 or the virtual hardware 133 via the hardware driver 157, 157 and/or the hardware pass-through unit 150. In step S323, the guest service program 153 is allowed to access the real hardware 20 or the virtual hardware 133 according to the indication of the access instruction 110 so as to obtain a second access result 2001 or a third access result 1331, and then transmit the second access result 2001 or the third access result 1331 to the host operating system 11 or the host application program for issuing the access instruction 110. Accordingly, the host operating system 11 or the host application program may be completed the data access procedure for the real hardware 20 or the virtual hardware 133.

Figure 6:
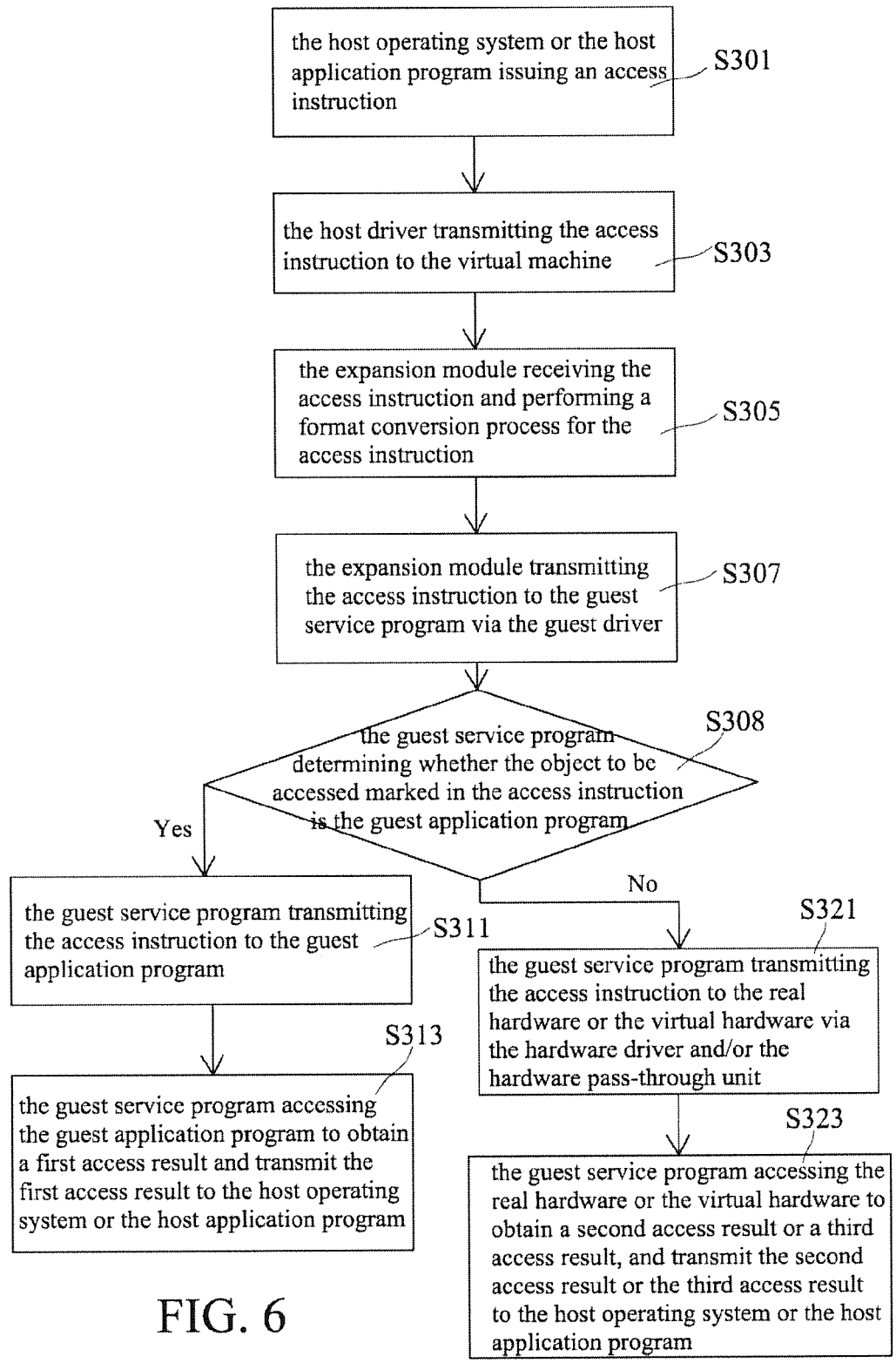
FIG. 6 is a flow chart of a method for accessing guest application program, real hardware or virtual hardware of virtual machine according to one embodiment of the present invention.

Referring to FIG. 6, cooperatively with FIG. 3, there is shown a flow chart of a method for accessing guest application program, real hardware or virtual hardware according to one embodiment of the present invention. When the host operating system 11 or a host application program is intended for executing the data access procedure for the guest application program 155, the real hardware 20, or the virtual hardware 133 of the virtual machine 12, such as the above described steps S301~S307, the host operating system 11 or the host application program is allowed to issue and transmit at least one access instruction 110 to the virtual machine 12, the expansion module 131 of the virtual machine 12 is for performing the format conversion process for the access instruction 110 after receiving the access instruction 110 so that the instruction format of the access instruction 110 can be recognized by the virtual machine 12, and then the format converted access instruction 110 is transmitted to the guest service program 153 via the guest driver 151.

Subsequently, in step S308, the guest service program 153 determines whether the object to be accessed is the guest application program 155 by recognizing the access instruction 110. If the guest service program 153 determines that the object to be accessed is the guest application program 155, proceeding to execute the step S311, the guest service program 153 will transmit the access instruction 110 to the guest application program 155, as well as executing the step S313, the guest service program 153 will be allowed to access the guest application program 155 according to the indication of the access instruction 110 so as to obtain the first access result 1551, and then transmit the first access result 1551 to the host operating system 11 or the host application program for issuing the access instruction 110.

Otherwise, if the guest service program 153 determines that the object to be accessed is the real hardware 20 or the virtual hardware 133, proceeding to execute the step S321, the guest service program 153 will transmit the access instruction 110 to the real hardware 20 or the virtual hardware 133 via the hardware driver 157, 157 and/or the hardware pass-through unit 150, as well as executing the step S323, the guest service program 153 will be allowed to access the real hardware 20 or the virtual hardware 133 according to the indication of the access instruction 110 so as to obtain the second access result 2001 or the third access result 1331, and then transmit the second access result 2001 or the third access result 1331 to the host operating system 11 or the host application program for issuing the access instruction 110.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A computer system for accessing virtual machine, comprising:
   a host driver, installed in a host operating system; and
   a virtual machine, installed in said host operating system, wherein said host operating system or a host application program is for issuing at least one access instruction, said access instruction is then transmitted to said virtual machine via said host driver, said virtual machine comprising:
      a hypervisor, comprising an expansion module, wherein said expansion module receives said access instruction from said host driver, and performs a format conversion process for said access instruction so that the instruction format of said access instruction can be recognized by said virtual machine; and
      a guest operating system, comprising:
         a guest driver;
         a guest service program, wherein said guest driver receives said access instruction from said expansion module and transmits said access instruction to said guest service program, said guest service program will recognize that said access instruction is a read instruction, a write instruction, or a control instruction; and
         a guest application program, wherein said guest service program is allowed to access said guest application program according to the indication of said access instruction so as to obtain a first access result, and then transmit said first access result to said host operating system or said host application program.

2. The computer system according to claim 1, wherein said first access result obtained by said guest service program accessing said guest application program is transmitted to said host operating system or said host application program via said guest driver, said expansion module and said host driver.

3. The computer system according to claim 1, wherein said guest application program of said virtual machine is a program capable of executing in said host operating system.

4. The computer system according to claim 1, wherein said guest operating system further comprises a first hardware driver, said first hardware driver is connected to a real hardware via a hardware pass-through unit, said guest service program transmits said access instruction to said real hardware via said first hardware driver and said hardware pass-through unit so as to access said real hardware, therefore obtain a second access result, and then transmit said second access result to said host operating system or said host application program.

5. The computer system according to claim 4, wherein said second access result obtained by said guest service program accessing said real hardware is transmitted to said host operating system or said host application program via said guest driver, said expansion module and said host driver.

6. The computer system according to claim 1, wherein said hypervisor further comprises a virtual hardware, said guest operating system further comprises a second hardware driver, said guest service program transmits said access instruction to said virtual hardware via said second hardware driver so as to access said virtual hardware, therefore obtain a third access result, and then transmit said third access result to said host operating system or said host application program.

7. The computer system according to claim 1, wherein said virtual machine is simulated as a system device or a peripheral device conforming to PCI, PCI Express, SATA or USB transport protocols by said host operating system.

8. A computer system for accessing virtual machine, comprising:
   a host driver, installed in a host operating system;
   a virtual machine, installed in said host operating system, wherein said host operating system or a host application program is for issuing at least one access instruction, said access instruction is then transmitted to said virtual machine via said host driver, said virtual machine comprising:
      a hypervisor, comprising an expansion module, wherein said expansion module receives said access instruction, and performs a format conversion process for said access instruction so that the instruction format of said access instruction can be recognized by said virtual machine; and
      a guest operating system, comprising:
         a guest driver;
         a guest service program, wherein said guest driver receives said access instruction from said expansion module and transmits said access instruction to said guest service program, said guest service program will recognize that said access instruction is a read instruction, a write instruction, or a control instruction; and
         a first hardware driver; and
      a real hardware, wherein said first hardware driver is connected to said real hardware via a hardware pass-through unit, said guest service program transmits said access instruction to said real hardware via said first hardware driver and said hardware pass-through unit so as to access said real hardware, therefore obtain a second access result, and then transmit said second access result to said host operating system or said host application program.

9. The computer system according to claim 8, wherein said second access result obtained by said guest service program accessing said real hardware is transmitted to said host operating system or said host application program via said guest driver, said expansion module and said host driver.

10. The computer system according to claim 8, wherein said hypervisor further comprises a virtual hardware, said guest operating system further comprises a second hardware driver, said guest service program transmits said access instruction to said virtual hardware via said second hardware driver no as to access said virtual hardware, therefore obtain a third access result, and then transmit said third access result to said host operating system or said host application program.

11. The computer system according to claim 8, wherein said virtual machine is simulated as a system device or a peripheral device conforming to PCI, PCI Express, SATA or USB transport protocols by said host operating system.

12. A method for accessing virtual machine, said method being applied to a computer system that will regard said virtual machine as a system device, a peripheral device, or an application program, said computer system comprising a host operating system installed with a host driver and a virtual machine, said virtual machine comprising a hypervisor and a guest operating system, in which said hypervisor comprises an expansion module, said guest operating system comprises a guest driver, a guest service program, and a guest application program, said method comprising the following steps of:
  issuing an access instruction from said host operating system or a host application program;
  transmitting said access instruction to said virtual machine via said host driver;
  receiving said access instruction via said expansion module of said hypervisor by said virtual machine and performing a format conversion process for said access instruction by said expansion module of said hypervisor so that the instruction format of said access instruction can be recognized by said virtual machine;
  transmitting said access instruction to said guest service program via said guest driver by said expansion module of said hypervisor; and
  accessing said guest application program according to the indication of said access instruction by said guest service program so as to obtain a first access result and then transmit said first access result to said host operating system or said host application program.

13. The method according to claim 12, wherein said guest operating system further comprises a first hardware driver, said first hardware driver is connected to a real hardware via a hardware pass-through unit, said method further comprising a step of:
  transmitting said access instruction to said real hardware via said first hardware driver and said hardware pass-through unit by said guest service program so as to access said real hardware, therefore obtain a second access result, and then transmit said second access result to said host operating system or said host application program.

14. The method according to claim 13, wherein said hypervisor further comprises a virtual hardware, said guest operating system further comprises a second hardware driver, said method further comprising a step of:
  transmitting said access instruction to said virtual hardware via said second hardware driver by said guest service program so as to access said virtual hardware, therefore obtain a third access result, and then transmit said third access result to said host operating system or said host application program.

15. The method according to claim 14, said method further comprising the following step of:
  determining a object to be accessed marked in said access instruction being said guest application program, said real hardware, or said virtual hardware by said guest service program; and
  accessing said guest application program, said real hardware, or said virtual hardware according to determining said object to be accessed marked in said access instruction.

16. A method for accessing virtual machine, said method being applied to a computer system that will regard said virtual machine as a system device, a peripheral device, or an application program, said computer system comprising a host operating system installed with a host driver and a virtual machine, said virtual machine comprising a hypervisor and a guest operating system, in which said hypervisor comprises an expansion module, said guest operating system comprises a guest driver, a guest service program, and a first hardware driver, said first hardware driver is connected to a real hardware via a hardware pass-through unit, said method comprising the steps of:
  issuing an access instruction from said host operating system or a host application program;
  transmitting said access instruction to said virtual machine via said host driver;
  receiving said access instruction via said expansion module of said hypervisor by said virtual machine and performing a format conversion process for said access instruction by said expansion module of said hypervisor so that the instruction format of said access instruction can be recognized by said virtual machine;
  transmitting said access instruction to said guest service program via said guest driver by said expansion module of said hypervisor; and
  transmitting said access instruction to said real hardware via said first hardware driver and said hardware pass-through unit by said guest service program so as to access said real hardware, therefore obtain a second access result, and then transmit said second access result to said host operating system or said host application program.

17. The method according to claim 16, wherein said hypervisor further comprises a virtual hardware, said guest operating system further comprises a second hardware driver, said method further comprising a step of:
  transmitting said access instruction to said virtual hardware via said second hardware driver by said guest service program so as to access said virtual hardware, therefore obtain a third access result, and then transmit said third access result to said host operating system or said host application program.

* * * * *